Dec. 5, 1961  F. ENGELHORN ET AL  3,011,650
ADJUSTABLE SMOKEHOUSE TREES
Filed Aug. 7, 1959  3 Sheets-Sheet 1
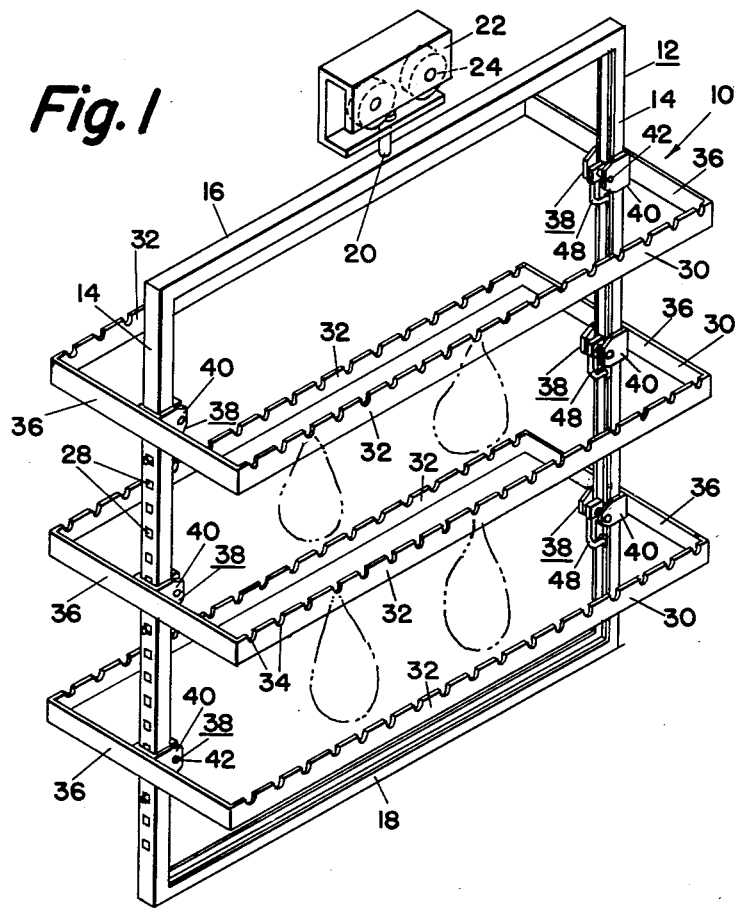
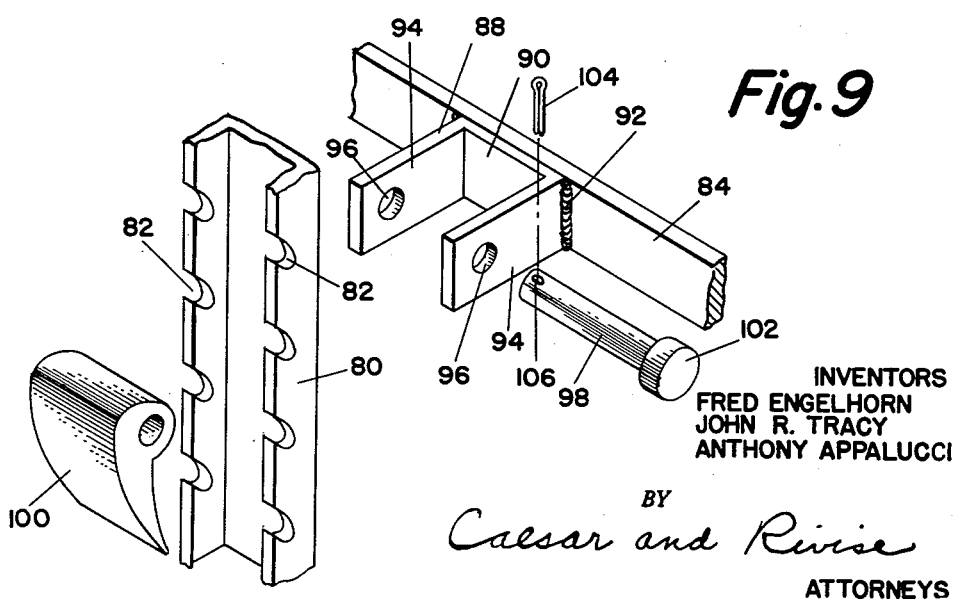
INVENTORS
FRED ENGELHORN
JOHN R. TRACY
ANTHONY APPALUCCI
BY
Caesar and Rivise
ATTORNEYS Dec. 5, 1961     F. ENGELHORN ET AL     3,011,650
ADJUSTABLE SMOKEHOUSE TREES
Filed Aug. 7, 1959     3 Sheets-Sheet 2
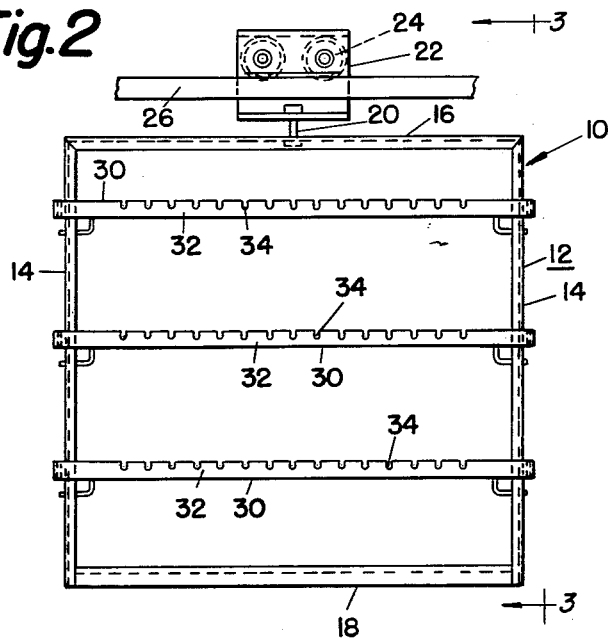
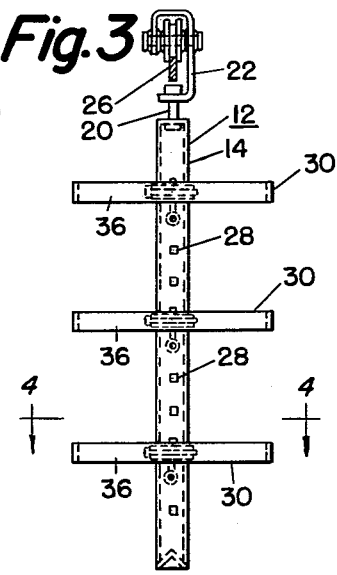
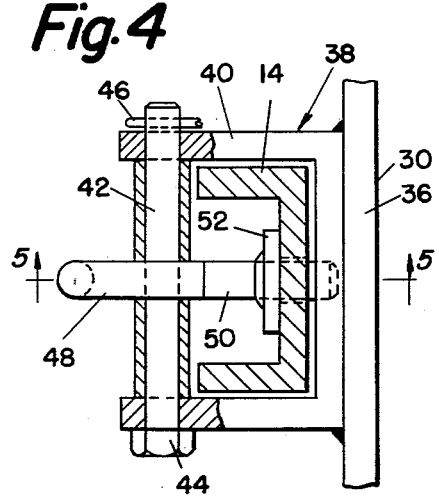
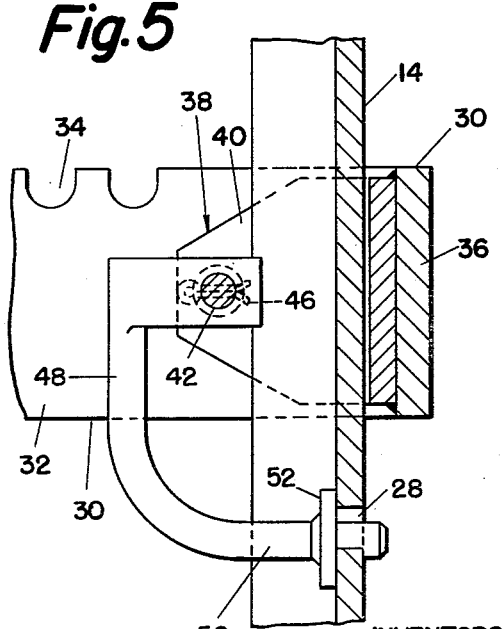
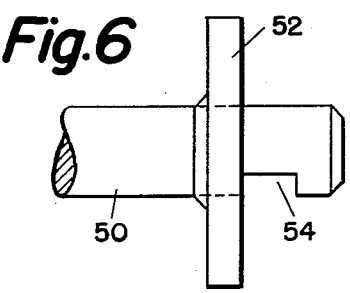
INVENTORS
FRED ENGELHORN
JOHN R. TRACY
ANTHONY APPALUCCI
BY
*Caesar and Rivise*
ATTORNEYS Dec. 5, 1961  F. ENGELHORN ET AL  3,011,650
ADJUSTABLE SMOKEHOUSE TREES
Filed Aug. 7, 1959  3 Sheets-Sheet 3
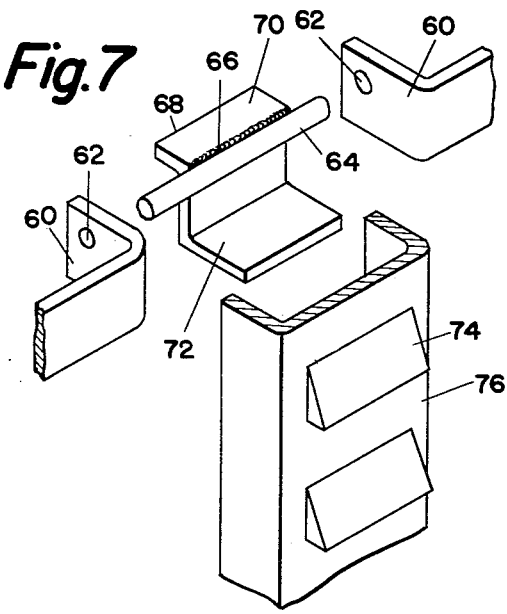
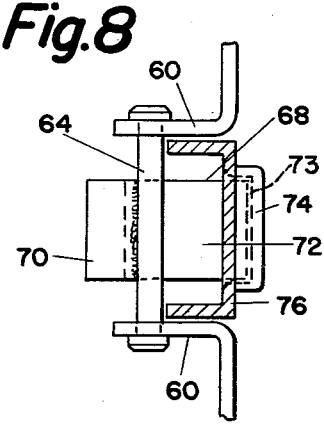
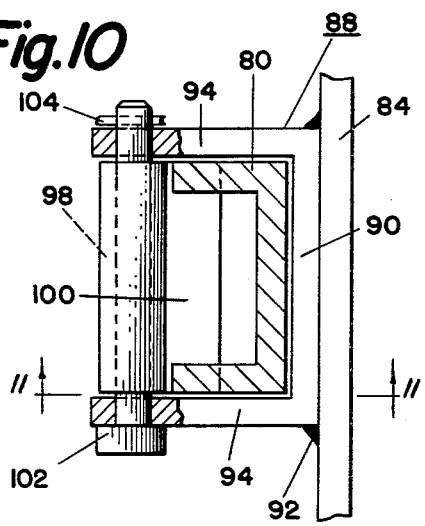
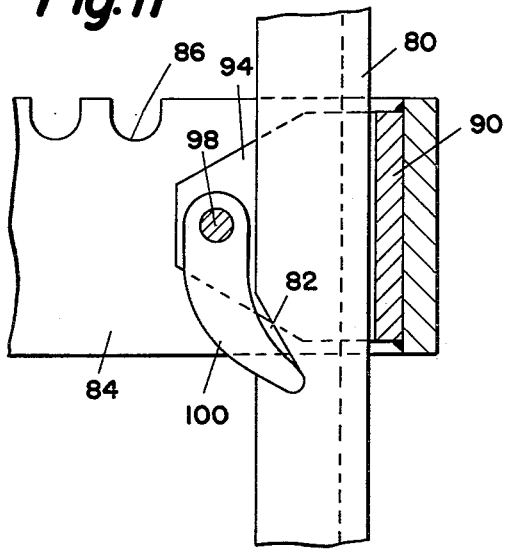
INVENTORS
FRED ENGELHORN
JOHN R. TRACY
ANTHONY APPALUCCI
BY
*Caesar and Rivise*
ATTORNEYS

United States Patent Office 3,011,650
Patented Dec. 5, 1961

3,011,650
ADJUSTABLE SMOKEHOUSE TREES
Fred Engelhorn, Newark, N.J., John R. Tracy, Philadelphia, Pa., and Anthony Appaluci, Maple Shade, N.J., assignors to John Engelhorn & Sons, Inc., Philadelphia, Pa., a corporation of New Jersey
Filed Aug. 7, 1959, Ser. No. 832,233
5 Claims. (Cl. 211—117)

This invention relates to the so-called smokehouse trees having one or more racks thereon to support meats during the smoking process, and it more particularly relates to apparatus of this type whereby the racks are adjustably positioned on the tree.

Smokehouse trees generally comprise a frame which is vertically suspended from an overhead rail system whereby the tree may be easily moved from one position to another. The frame carries at least one and usually several racks upon which slabs of meat are hung. These racks are preferably removable and are also preferably vertically adjustable to accommodate various types and sizes of meat cuts.

The adjustment of the racks has heretofore presented a problem because they must be securely held in each adjusted position in order to prevent possible falling and the consequent danger of injury to personnel as well as damage to the meat and to the apparatus itself. Since the racks are generally constructed of heavy metal such as iron or steel and since the load of meat thereon is often quite large, the securing means for holding the racks in adjusted position had to be strong and trustworthy. It was, therefore, the general practice to make the opposite ends of the racks slidable on the frame and to provide a heavy set-screw at each side of the frame. In practice, to adjust the frame, the set screw was loosened, the frame was moved to the desired position, and then the set screw was tightened.

Although the above-described set screw method appears to be a simple and effective manner of adjustment, in practice, there were many difficulties. One of these difficulties was that the set screw had to be so tightly fastened that it was necessary to use a wrench to tighten and loosen them. This required that such a wrench be constantly available to the personnel using the trees. In the turmoil of the processing plant, the wrenches were often lost or mislaid.

It also required an inordinate amount of time to loosen the set screws on each side, move the rack and then tighten the set screws. In view of the size and nature of the racks, two men were usually required for this adjustment.

In addition, the set screws were often jammed in by the accumulation of grease and dirt and it was most difficult to move them. Even when they were movable, they still tended to become a source for the accumulation of much grease and dirt and it was difficult and time consuming to clean them properly.

It is one object of the present invention to overcome the aforesaid defects of the prior type smokehouse trees by providing an adjustable type apparatus which eliminates the use of set screws and which permits easy vertical adjustment of the racks with an automatic locking thereof when in the desired adjusted position.

Another object of the present invention is to provide a smokehouse tree of the aforesaid type which is easy to operate and which is easily kept clean.

Another object of the present invention is to provide a smokehouse tree of the aforesaid type which is sturdy yet simple in construction and which is relatively inexpensive to manufacture.

Other objects and many of the attendant advantages of this invention will be readily appreciated as the same becomes better understood by reference to the following detailed description when considered in connection with the accompanying drawings, wherein:

FIG. 1 is a perspective view of one embodiment of the present invention;

FIG. 2 is a front elevational view of the device of FIG. 1;

FIG. 3 is an end elevational view taken on line 3—3 of FIG. 2;

FIG. 4 is an enlarged, detailed view, partly in elevation and partly in section, taken on line 4—4 of FIG. 3;

FIG. 5 is an enlarged, detailed, fragmentary view, partly in elevation and partly in section, taken on line 5—5 of FIG. 4;

FIG. 6 is an enlarged, fragmentary, detailed elevational view of the adjustment securing means used in the device of FIGS. 1 to 5;

FIG. 7 is a fragmentary, exploded view of a modified form of adjustment means;

FIG. 8 is a cross-sectional view of the elements of FIG. 7 shown in assembled condition;

FIG. 9 is a fragmentary, exploded view of a third embodiment of the present invention;

FIG. 10 is an assembled view, similar to that of FIG. 4, but pertaining to the embodiment of FIG. 9;

FIG. 11 is a view, similar to FIG. 5, but taken on line 11—11 of FIG. 10.

Referring now in greater detail to the various figures of the drawings wherein similar reference characters refer to similar parts, there is shown in FIG. 1 a smokehouse tree, generally designated 10, which comprises a rectangular frame 12 having vertical sides 14, an upper end 16 and a lower end 18.

The frame 12 is of channel construction (as best seen in FIGS. 1 and 4) and is preferably made of steel or iron, although other metals such as aluminum and the like, or even a high strength plastic can be used.

At the middle of the upper end 16 of the frame is provided a hanger 20 attached to a bracket 22 in which are rotatably positioned a pair of overhead grooved rollers 24. These rollers are adapted to rotatably engage the top of a rail 26.

As best seen in FIGS. 1 and 3, each of the vertical sides 14 of the frame is provided with a series of apertures 28 of generally square shape. These apertures are for the purpose of releasably receiving a locking pin which will be hereinafter more fully described.

Mounted on the frame 12 and encompassing both sides thereof are a plurality of rectangular racks 30. Each of these racks includes a pair of longitudinal sides 32 provided with notches 34 and a pair of end portions 36, each provided with a locking means 38.

Each locking means 38 comprises a bracket 40 having opposed arms apertured to receive the ends of a pivot pin 42. This pin 42 is held in place by a head 44 and a cotter pin 46. Rockably mounted on the pin 42 is a locking arm 48 having an elbow portion intermediate its length and a transversely offset locking portion 50 at its lower end.

The portion 50 is provided with a flange 52 slightly spaced from the free end and a recess 54 between the flange and the free end. The arm 48 is biased downwardly around the pivot pin 42 by its own weight, and its free end is adapted to enter one of the apertures 28. When it enters such aperture, it is held therein by engagement of the recess 54 with the lower edge of the aperture (as best shown in FIG. 5) while the flange 52 abuts the interior of the channel member 14 to act as a stop means to prevent further outward movement of the arm.

In operation, when it is desired to adjust the vertical position of any one of the racks, it can be accomplished by grasping the elbow portions of the locking arms on each end of the rack and pulling out and then up. This releases the locking arms from the apertures 28 and permits movement of the rack up or down to the desired position. When this position is reached, the free ends of the locking arms are guided into the appropriate apertures 28 and the rack is then securely in place.

In somewhat the same manner, the racks can be removed by merely releasing the locking arms and lifting the rack over the frame 12. The racks can be replaced by the reverse procedure.

In FIGS. 7 and 8 there is shown a modified form of the invention wherein the ends of the racks are split to form separate arms 60 and these arms 60 are each provided with an aperture 62 to receive a pin 64. The pin 64 is welded, as at 66, or otherwise secured to a rocking member 68 having an upper outwardly-extending flange 70 and an inwardly-extending lower flange 72 of relatively larger size and weight than flange 70. The flange 72 is adapted to releasably engage within a selected recess 73 of a series thereof formed by extruded portions 74 on the side members 76 similar to members 14.

In operation, the flanges 70 act as finger pieces to rock the member 68 to release the flanges 72 from the corresponding recesses 73. The flanges 72 are normally held in the recesses 73 in which they have been inserted by the gravity bias on the members 68.

With the flanges 72 held in released position by maintaining pressure on the corresponding finger pieces 70, the rack is adjusted to the desired position wherein the flanges 72 are aligned with the corresponding recesses 73 in the side members 76, and then the finger pieces are released to permit the flanges to be inserted into and retained in the recesses by the force of gravity.

In FIGS. 9, 10 and 11 there is shown a third embodiment of the invention wherein side members 80, corresponding to side members 14 of FIG. 1 and 76 of FIG. 7, is also made of channel shape but is provided with a series of downwardly inclined slots 82 along each inner vertical edge, the slots 82 of one edge being aligned with the slots 82 of the other edge (as best seen in FIG. 9).

The racks used in this form of the invention are designated 84 and are provided with the usual notches 86. The ends of these racks are each provided with a bracket 88 having a rear wall 90 welded or otherwise secured to the rack, as at 92, and a pair of forwardly extending arms 94 having aligned apertures 96 to receive a pivot pin 98. Rockably mounted on this pin 98 is an inwardly curved finger 100. This finger 100 is gravity-biased downwardly and into engagement with a pair of aligned slots 82. The supporting pin 98 is retained in the bracket by a head 102 at one end and a cotter pin 104 at the other end, this cotter pin extending through a transverse bore 106 in the pin.

In operation, the rack 84 is adjustable on the supporting frame by lifting up on the rack to free the finger 100 from the slots 82 and then moving the rack to the desired position, at which time the finger is guided back into the slots 82 corresponding to that position. When thereafter released, the weight of the finger holds it in the slots.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A smokehouse tree comprising a generally rectangular frame having parallel top and bottom portions separated by parallel side portions, said side portions being of inwardly opening channel construction whereby the channel is defined by a rear wall and two side walls, at least one rack of generally rectangular shape encompassing said side portions and adjustably connected thereto, said rack comprising two sides and two ends integral with one another, said sides being provided with a plurality of notches and said ends each being provided with a releasable locking means, said locking means comprising a rockable member pivotally mounted on said frame inwardly on the corresponding side portion of the frame and on a horizontal axis, said rockable member being biased by gravity to swing downwardly toward the corresponding side portion of the frame and being entirely exposed for manual accessibility, and a series of vertically spaced reception means on each of said side portions of the frame, the rockable members on the opposite ends of the rack being each held in positive engagement with a selected reception means on the corresponding side portion of the frame by the force of gravity.

2. The smokehouse tree of claim 1 wherein said rockable member comprises an arm having a downwardly-extending upper end, a laterally extending lower end and an elbow integrally connecting said two ends, said upper end being pivoted on a pivot pin retained in a bracket connected to the inner surface of the corresponding end of the rack, and said lower end having a recess therein, said lower end being selectively receivable in a selected one of a vertical series of generally square apertures in the rear wall of the corresponding side portion of the frame with said recess in engagement with the lower edge of the aperture, said apertures constituting said reception means.

3. The smokehouse tree of claim 1 wherein said rockable member comprises a stepped member having a relatively small lateral flange at its upper end forming a finger piece, and a relatively large lateral flange at its lower end, forming a detent, said upper flange extending away from and said lower flange extending toward the corresponding side portion of said frame, said stepped member being pivoted on a pivot pin mounted on the corresponding end of the rack, and said lower flange being selectively receivable in a selected one of a vertical series of extruded recesses on the corresponding side portion of the frame, said extruded recesses constituting said reception means.

4. The smokehouse tree of claim 1 wherein said side portions of the frame are each provided with a vertical series of downwardly inclined slots along the edges of the side walls defining the channel therein, the slots on said side walls being mutually aligned to form a series of pairs, said pairs of slots constituting said reception means, and said rockable member comprising a finger pivoted at its upper end to the corresponding end of the rack and having its lower end gravity-biased into engagement with a selected pair of slots.

5. The smokehouse tree of claim 1 wherein said top portion of the frame is provided with a hanger having rollers thereon to coact with a supporting rail.

References Cited in the file of this patent

UNITED STATES PATENTS

| 152,955 | Sleeper | July 14, 1874 |
| 639,549 | Fitzgerald | Dec. 19, 1899 |
| 742,007 | Collis | Oct. 20, 1903 |
| 861,900 | Rhodes | July 30, 1907 |
| 965,717 | Kitsteiner | July 26, 1910 |
| 1,006,834 | Edwards | Oct. 24, 1911 |
| 1,488,300 | Thompson | Mar. 25, 1924 |
| 1,653,539 | Benn | Dec. 20, 1927 |
| 2,314,490 | Goldman | Mar. 23, 1943 |